(12) United States Patent
Weast

(10) Patent No.: US 8,238,233 B2
(45) Date of Patent: Aug. 7, 2012

(54) MAINTAINING NETWORK SERVICES ACROSS MULTIPLE PHYSICAL INTERFACES

(75) Inventor: John C. Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 985 days.

(21) Appl. No.: 11/729,064

(22) Filed: Mar. 28, 2007

(65) Prior Publication Data

US 2008/0240135 A1  Oct. 2, 2008

(51) Int. Cl.
*H04M 1/00* (2006.01)
(52) U.S. Cl. ............ 370/229; 370/395.5
(58) Field of Classification Search ........ 370/395.5, 370/401; 455/422.1, 574, 575
See application file for complete search history.

(56) References Cited

U.S. PATENT DOCUMENTS

| | | | | |
|---|---|---|---|---|
| 7,233,792 | B2* | 6/2007 | Chang | 455/422.1 |
| 7,421,602 | B2* | 9/2008 | Sutardja | 713/324 |
| 7,975,079 | B2* | 7/2011 | Bennett et al. | 710/21 |
| 2002/0083351 | A1* | 6/2002 | Brabenac | 713/300 |
| 2002/0160769 | A1* | 10/2002 | Gray | 455/423 |
| 2004/0001470 | A1* | 1/2004 | Chen | 370/338 |
| 2004/0219955 | A1* | 11/2004 | daCosta | 455/574 |
| 2004/0224728 | A1* | 11/2004 | Dacosta et al. | 455/574 |
| 2004/0258051 | A1* | 12/2004 | Lee | 370/352 |
| 2005/0085245 | A1* | 4/2005 | Danneels | 455/466 |
| 2005/0085248 | A1* | 4/2005 | Ballay et al. | 455/500 |
| 2006/0211400 | A1* | 9/2006 | Bauman et al. | 455/343.1 |
| 2008/0002605 | A1* | 1/2008 | Todd et al. | 370/328 |
| 2008/0013504 | A1* | 1/2008 | Nishibayashi et al. | 370/338 |
| 2009/0077347 | A1 | 3/2009 | Edwards | |
| 2010/0157868 | A1* | 6/2010 | Yam | 370/311 |

OTHER PUBLICATIONS

Ylian Saint-Hilaire, "Intel® AMT Developer Tool Kit: Technical Overview," Jan. 2007, pp. 1-4.

* cited by examiner

*Primary Examiner* — Kwang B Yao
*Assistant Examiner* — Awet Haile
(74) *Attorney, Agent, or Firm* — Trop, Pruner & Hu, P.C.

(57) ABSTRACT

In one embodiment, the present invention includes an apparatus having a first processor to execute instructions, a subordinate processor coupled to the first processor, and multiple physical devices coupled to the subordinate processor. The physical devices may each correspond to a different network communication protocol, and may each include a physical unit to forward packets to the subordinate processor while the system is in a low power mode. The subordinate processor may remain enabled during the low power mode and may include media access control functionality for handling incoming packets of different physical devices. Other embodiments are described and claimed.

18 Claims, 2 Drawing Sheets

MAINTAINING NETWORK SERVICES ACROSS MULTIPLE PHYSICAL INTERFACES

BACKGROUND

Today's computer systems include many different components and physical interconnects to interconnect a given platform to various devices. In systems for the digital office and home, these different physical interconnects may include in addition to Ethernet connections, various wireless connections such as a so-called Wi-Fi connection in accordance with an Institute of Electrical and Electronics Engineers (IEEE) 802.11 standard such as an IEEE 802.11a/b/g standard, an ultra wideband (UWB) connection, a Bluetooth™ connection in accordance with a Bluetooth™ protocol, among many others.

A major issue in today's systems is reducing the amount of power consumed. Accordingly, various low power modes are available in many systems. However, to be able to remain interconnected for communication with these various physical interconnects, oftentimes many dedicated components within a system are required to remain powered on, reducing the benefits of low power states.

DETAILED DESCRIPTION

In various embodiments, a generic processing engine, such as may be present in a chipset of a system, may provide for performing certain protocol operations such as implemented in a media access control (MAC) unit to enable more of a given system to remain in a low power state, yet provide for connectivity to network packets received by the system. While the scope of the present invention is not limited in this regard, such a generic processing engine, which may be a general-purpose microprocessor, may be included in a chipset component such as a memory controller, input/output (I/O) controller or other such interface component. Note that this processing engine may be a generic application processor located in the chipset, with access to the different physical interfaces in the platform, which can then be used to provide network services across multiple physical interfaces.

Figure 1:
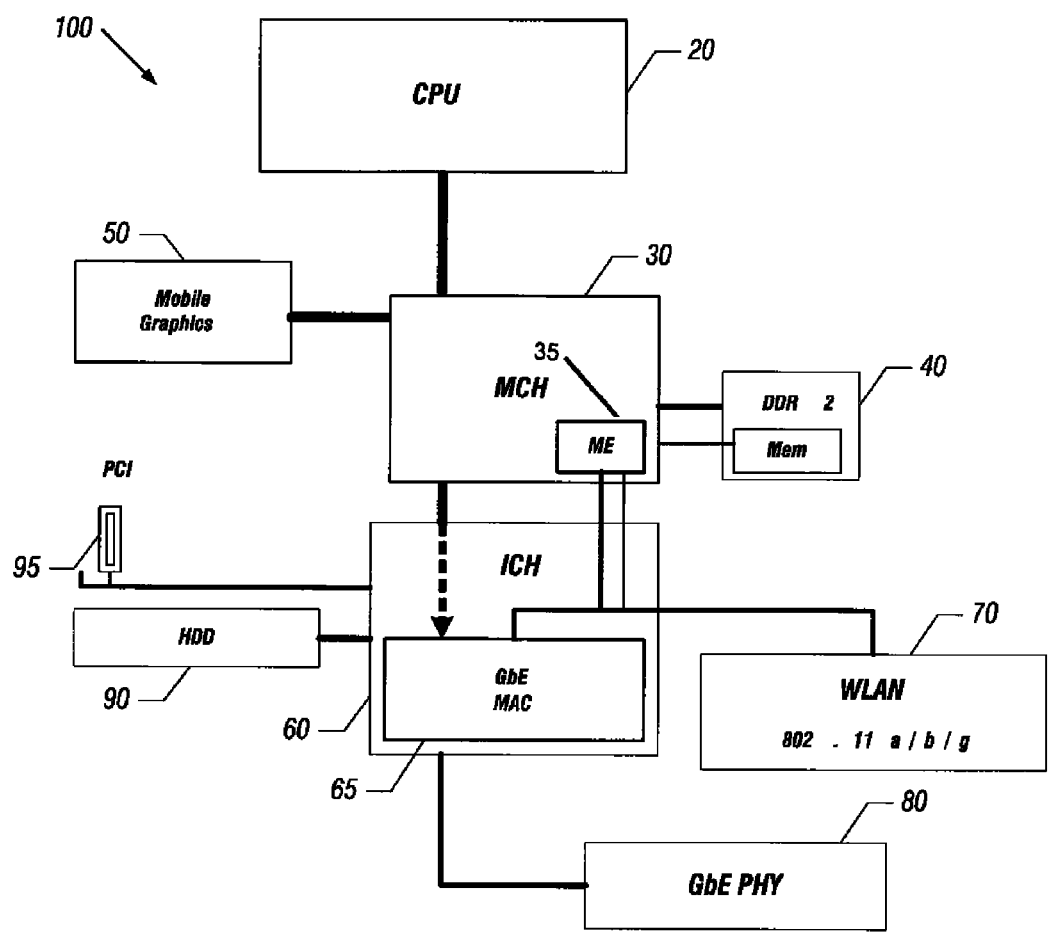
FIG. 1 is a block diagram of a system in accordance with an embodiment of the present invention.

Referring now to FIG. 1, shown is a block diagram of a system in accordance with an embodiment of the present invention. As shown in FIG. 1, system 10 includes a processor 20, which may be a microprocessor such as a multi-core processor. Processor 20 is coupled to a memory controller hub (MCH) 30 that includes a manageability engine (ME) 35. ME 35 may be configured to handle MAC features for various physical interconnects of system 10 to enable greater low power operation of system 10, while retaining network connectivity.

Still referring to FIG. 1, MCH 30 is coupled to a memory 40, which may be a dynamic random access memory (DRAM), e.g., a double data rate (DDR) memory. MCH 30 is further coupled to a graphics unit 50, which may be a graphics adaptor that in turn is provided to a display. In turn, MCH 30 is coupled to an I/O controller hub (ICH) 60. As shown, ICH 60 includes a MAC 65 such as a MAC unit of a gigabit Ethernet (GBE) network interface. In turn, ICH 60 is coupled to various physical interconnects, such as a wireless local area network (WLAN) adaptor 70, which may be in accordance with a given IEEE 802.11 standard or another local wireless protocol. Furthermore, ICH 60 is coupled to a physical (PHY) adaptor 80, which may be a network interconnect to an Ethernet network such as a GBE connection. ICH 60 is further coupled to a hard disk drive 90 and via a peripheral bus (e.g., a peripheral component interconnect (PCI) bus) to a PCI device 95, which may be a desired adaptor card or so forth. Note while shown with this particular implementation in the embodiment of FIG. 1, other implementations are possible. For example, in some implementations processor 20 may further include the components of MCH 30 and graphics unit 50, for example.

In various embodiments, ME 35 can provide network service aliveness across the multiple disparate physical network interfaces shown in FIG. 1. To enable ME 35 to provide service aliveness in a low power mode, various MAC-like components may be implemented in ME 35. For example, a generic port filter may be configured to execute on ME 35 such that the need for independent port filters for the various network devices shown in FIG. 1 can be avoided. In various embodiments, ME 35 may include hardware, software, firmware or combinations thereof to handle port filtering and processing of incoming packets when other portions of system 10 are in a low power state. Note in some embodiments the port filtering may be performed by combinations of software and/or firmware that execute on generic hardware of ME 35, allowing for a flexible framework for various usage scenarios. Furthermore, by handling packet detection response capabilities in ME 35, the cost of the associated physical interconnects may be reduced, as port filtering capabilities among other packet detection processing can be moved from the components to ME 35. To provide for a great deal of flexibility to both fine tune what interface source is maintained and how such services may be advertised on different interfaces, a configuration process may be performed in which a host (e.g., processor 20) may configure ME 35 to handle various packet types that may be associated with different network interfaces and the different applications, to be handled appropriately in a low power state.

Figure 2:
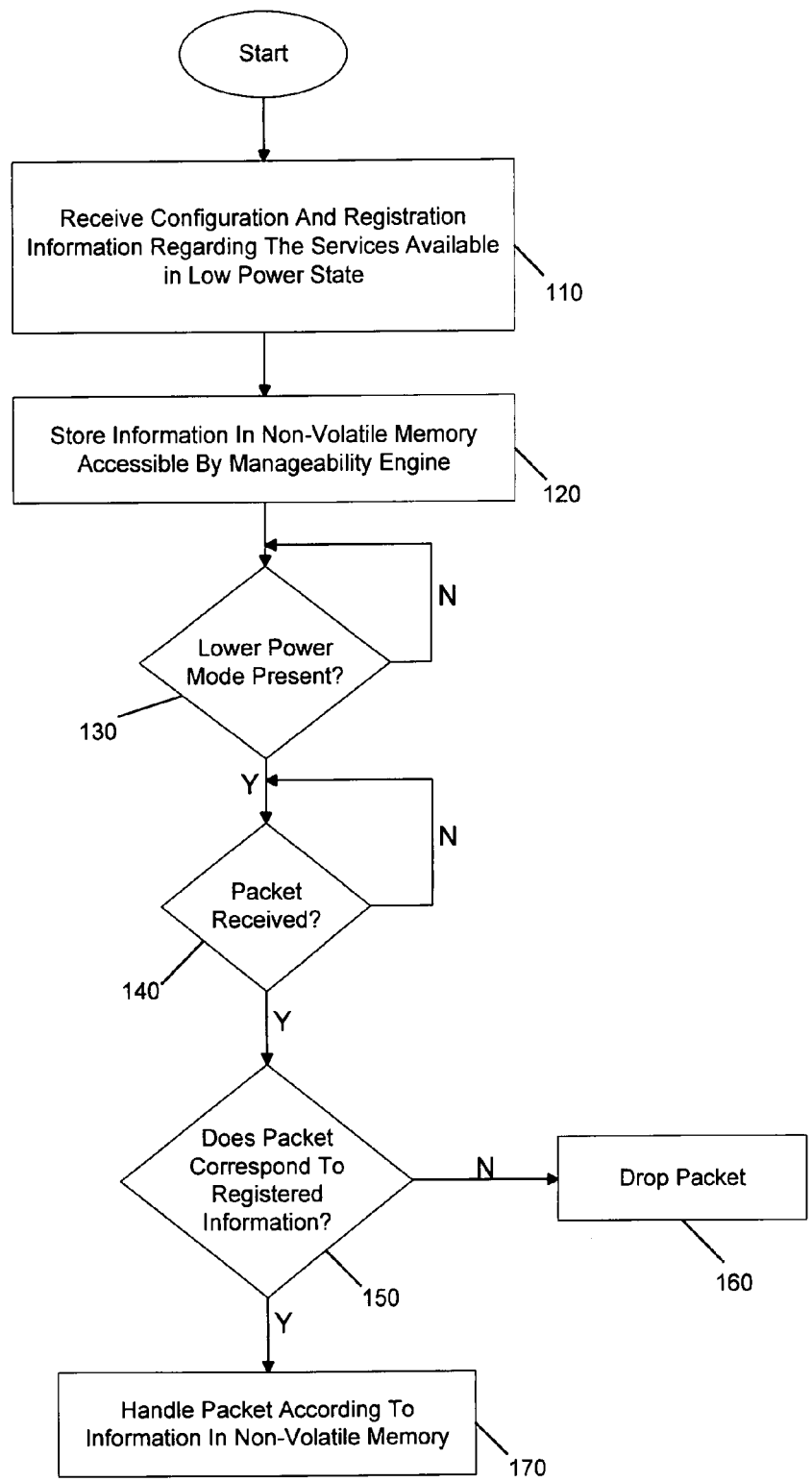
FIG. 2 is a flow diagram of a method in accordance with an embodiment of the present invention.

Referring now to FIG. 2, shown is a flow diagram of a method in accordance with an embodiment of the present invention. As shown in FIG. 2, method 100 may begin by receiving configuration and registration information regarding services available in a low power state (block 110). For example, in various implementations a processor may provide an ME with various information regarding different applications that are to possibly receive data while a system is in a low power state. The information may further correspond to given packet types, e.g., based on internet protocol (IP) address or so forth such as a port basis or in another manner, which may be used to handle incoming packets when in the low power mode. As shown in FIG. 2, such information may be stored in a non-volatile memory that is accessible by the ME (block 120). For example, in various embodiments a flash memory that may be present in a chipset in which ME is included, or another non-volatile memory to which it may have access can be used to store this information. Alternately, the information may be stored in a volatile memory where a host re-programs the memory every time before going to sleep. This information may be stored, for example, in a table that the ME can access when it receives an incoming packet during a low power mode.

Referring still to FIG. 2, during operation it may be determined whether a low power mode is present (diamond 130). For example, a processor such as processor 20 of FIG. 1 may send a message to ME 35 when it enters into a low power mode. If it is determined that the low power mode is present, next it may be determined whether an incoming packet is received at the ME from a given MAC unit in the system (diamond 140). If not, diamond 140 may loop back on itself. If an incoming packet is received, control passes to diamond 150 where it may be determined whether the packet corresponds to registered information (diamond 150). That is, it may be determined whether information associated with the packet, e.g., by way of port information, IP address information, packet type or so forth corresponds to data present in the non-volatile storage. If not, the packet may be dropped (block 160).

If instead the packet corresponds to the information in the non-volatile memory, the ME may handle the packet according to the information that is stored in the memory (block 170). For example, depending on the information stored in the memory that corresponds to the packet, the packet may be sent to a predetermined location, a wakeup signal may be sent to a given component, a response packet may be sent, e.g., in the example of a heartbeat message sent from a remote source or so forth. For example, if an incoming packet is a Bluetooth™ packet, certain limitations may exist in handling a packet in a low power mode. For example, such services as video streaming may not be provided due to limited available bandwidth, while a similar packet advertised over Ethernet may be handled. While shown with the particular implementation in the embodiment of FIG. 2, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first processor to execute instructions;
a subordinate processor coupled to the first processor, the subordinate processor including a generic processing engine corresponding to a general-purpose processor to remain enabled during a low power mode of a system, the generic processing engine to perform media access control (MAC) functionality for handling incoming packets of different packet types and from different physical devices, and a generic port filter to execute on the generic processing engine to filter the packets received from the plurality of physical devices including at least one wired device and at least one wireless device; and
the plurality of physical devices coupled to the subordinate processor, each by a physical interconnect, the plurality of physical devices each corresponding to a different network communication protocol, each including a physical (PHY) unit to receive the incoming packets and forward the incoming packets to the subordinate processor while the system is in the low power mode, wherein at least one of the plurality of physical devices does not include a port filter;
wherein the plurality of physical devices includes a memory, a graphics unit, a wireless local area network (WLAN) device, an input/output controller including a MAC unit of an Ethernet network interface, and an Ethernet device to be a network interconnect to an Ethernet network.

2. The apparatus of claim 1, wherein the subordinate processor is located in a chipset of the system.

3. The apparatus of claim 2, wherein the MAC functionality is implemented in software of the subordinate processor.

4. The apparatus of claim 1, wherein a first one of the plurality of physical devices corresponds to a wireless local area network (WLAN) device and a second one of the plurality of physical network devices corresponds to an Ethernet device.

5. The apparatus of claim 1, further comprising a non-volatile memory to store a table of packet types and information regarding handling of the incoming packets during the low power mode.

6. The apparatus of claim 5, wherein the first processor is to instruct the subordinate processor to program the table.

7. The apparatus of claim 1, wherein the generic port filter comprises software to be executed on the subordinate processor.

8. The apparatus of claim 5, wherein the subordinate processor is to access the table during the low power mode.

9. A method comprising:
receiving configuration information regarding network services available in a low power state of a system;
storing the configuration information in a non-volatile memory accessible by a subordinate processor of a chipset of the system in the low power state, the subordinate processor including a generic processing engine corresponding to a general-purpose processor to execute a generic port filter to filter the packets received from a plurality of disparate network devices including at least one wired device and at least one wireless device;
wherein the plurality of disparate network devices includes a memory, a graphics unit, a wireless local area network (WLAN) device, an input/output controller including a media access control (MAC) unit of an Ethernet network interface, and at least one wired device to be a network interconnect to an Ethernet network; and
receiving a packet in the subordinate processor from a MAC unit of one of the plurality of disparate network devices of the system coupled to the subordinate processor via a physical interconnect while the system is in the low power state and accessing the non-volatile memory to determine how to handle the packet.

10. The method of claim 9, further comprising processing the packet with the subordinate processor in the low power state based on the configuration information in the non-volatile memory.

11. The method of claim 10, further comprising sending a wake up signal to a primary processor of the system responsive to the packet and based on the configuration information in the non-volatile memory.

12. The method of claim 11, further comprising receiving the configuration information in the subordinate processor from the primary processor.

13. The method of claim 10, further comprising dropping the packet if information corresponding to the packet is not present in the non-volatile memory.

14. The method of claim 10, further comprising not handling a service for a first packet received from the at least one wireless device and handling the service for a second packet received from the at least one wired device, the first and second packets regarding the same service.

15. The method of claim 10, further comprising sending a response message to a source of the packet when the packet is a heartbeat message.

16. A system comprising:
   a first processor to execute instructions;
   a chipset coupled to the first processor, the chipset to remain enabled during a low power mode of the system, the chipset including a manageability engine having media access control (MAC) functionality for handling incoming packets of different packet types and from a plurality of physical devices, the manageability engine to execute a generic port filter to filter the incoming packets received from the plurality of physical devices;
   a memory coupled to the chipset by a first physical interconnect, the memory corresponding to a first one of the plurality of physical devices;
   a graphics unit coupled to the chipset by a second physical interconnect, the graphics unit corresponding to a second one of the plurality of physical devices;
   an input/output controller coupled to the chipset by a third physical interconnect, the input/output controller including a MAC unit of an Ethernet network interface and corresponding to a third one of the plurality of physical devices;
   a wireless adapter coupled to the input/output controller by a fourth physical interconnect and corresponding to a fourth one of the plurality of physical devices;
   a physical adaptor corresponding to a network interconnect to the Ethernet network and coupled to the input/output controller by a fifth physical interconnect, the physical adaptor corresponding to a fifth one of the plurality of physical devices; and
   wherein the plurality of physical devices each correspond to a different network communication protocol, and each include a physical (PHY) unit to receive the incoming packets and forward the incoming packets to the chipset while the system is in the low power mode, and at least one of the plurality of physical devices does not include a port filter.

17. The system of claim 16, further comprising a non-volatile memory to store a table of packet types and information regarding handling of the incoming packets during the low power mode.

18. The system of claim 17, wherein the generic port filter comprises software to be executed on the chipset and the first processor is to instruct the chipset to program the table.

* * * * *